US010273188B2

(12) United States Patent
Bichler et al.

(10) Patent No.: US 10,273,188 B2
(45) Date of Patent: Apr. 30, 2019

(54) POWDER COMPOSITION FOR RAPID SUSPENSION

(71) Applicant: BASF Construction Solutions GmbH, Trostberg (DE)

(72) Inventors: Manfred Bichler, Engelsberg (DE); Michael Schinabeck, Altenmarkt (DE); Norbert Steidl, Kienberg (DE); Werner Strauss, Traustein (DE); Markus Maier, Trostberg (DE); Markus Wilde, Neu-Ulm (DE)

(73) Assignee: BASF Construction Solutions GmbH, Trostberg (DE)

( * ) Notice: Subject to any disclaimer, the term of this patent is extended or adjusted under 35 U.S.C. 154(b) by 542 days.

(21) Appl. No.: 14/347,118

(22) PCT Filed: Sep. 25, 2012

(86) PCT No.: PCT/EP2012/068827
§ 371 (c)(1),
(2) Date: Mar. 25, 2014

(87) PCT Pub. No.: WO2013/045419
PCT Pub. Date: Apr. 4, 2013

(65) Prior Publication Data
US 2014/0235760 A1    Aug. 21, 2014

(30) Foreign Application Priority Data

Sep. 30, 2011   (EP) .................................. 11183537

(51) Int. Cl.
| | |
|---|---|
| *C04B 28/04* | (2006.01) |
| *C04B 28/06* | (2006.01) |
| *C08F 220/06* | (2006.01) |
| *C08K 5/06* | (2006.01) |
| *C08K 5/1565* | (2006.01) |
| *C04B 24/26* | (2006.01) |
| *C04B 28/02* | (2006.01) |
| *C04B 28/14* | (2006.01) |
| *C08F 216/14* | (2006.01) |
| *C08F 220/28* | (2006.01) |

(Continued)

(52) U.S. Cl.
CPC .......... *C04B 28/04* (2013.01); *C04B 20/1033* (2013.01); *C04B 24/267* (2013.01); *C04B 24/2647* (2013.01); *C04B 24/2658* (2013.01); *C04B 28/02* (2013.01); *C04B 28/06* (2013.01); *C04B 28/065* (2013.01); *C04B 28/14* (2013.01); *C08F 216/1416* (2013.01); *C08F 220/06* (2013.01); *C08F 220/28* (2013.01); *C08F 290/142* (2013.01); *C08K 5/06* (2013.01); *C08K 5/1565* (2013.01); *C04B 2111/00482* (2013.01); *C04B 2111/00637* (2013.01); *C04B 2111/00672* (2013.01); *C04B 2111/62* (2013.01); *C04B 2111/70* (2013.01); *C04B 2111/72* (2013.01); *C08F 222/06* (2013.01); *C08F 2220/286* (2013.01)

(58) Field of Classification Search
CPC ..... C04B 28/04; C04B 28/06; C04B 24/2647; C04B 24/267; C04B 28/02; C04B 28/065; C04B 24/2658; C04B 20/1033; C04B 7/02; C04B 2111/00482; C04B 2111/00637; C04B 2111/00672; C04B 2111/62; C04B 2111/70; C04B 2111/72; C04B 2103/50; C04B 28/14; C08F 220/06; C08F 216/1416; C08F 220/28; C08F 222/06; C08F 2220/286; C08F 290/142; C08K 5/1565; C08K 5/06
USPC .................................. 524/5, 556; 526/318.5
See application file for complete search history.

(56) References Cited

U.S. PATENT DOCUMENTS

| | | |
|---|---|---|
| 4,725,665 A | 2/1988 | Pieh et al. |
| 5,302,308 A | 4/1994 | Roe |

(Continued)

FOREIGN PATENT DOCUMENTS

| | | |
|---|---|---|
| DE | 29 48 698 A1 | 6/1981 |
| DE | 35 30 258 A1 | 2/1987 |

(Continued)

OTHER PUBLICATIONS

European Search Report dated Apr. 2, 2012 for corresponding European Patent Application No. EP 2574636.

(Continued)

*Primary Examiner* — Josephine L Chang
(74) *Attorney, Agent, or Firm* — Curatolo Sidoti Co., LPA; Joseph G. Curatolo; Salvatore A. Sidoti

(57) ABSTRACT

The invention relates to a pulverulent composition which can be produced by bringing a powder which comprises at least one inorganic binder into contact with from 0.01 to 10% by weight, based on the total mass of the composition, of a liquid component comprising at least one copolymer which can be obtained by polymerization of a mixture of monomers comprising (I) at least one ethylenically unsaturated monomer which comprises at least one radical selected from the group consisting of carboxylic acid, carboxylic acid salt, carboxylic esters, carboxamide, carboxylic anhydride and carboximide and (II) at least one ethylenically unsaturated monomer having a polyalkylene oxide radical, where the liquid component contains at least 1% by weight of the at least one copolymer and at least 30% by weight of an organic solvent. Furthermore, a process for producing the liquid component, the use thereof and also specific copolymers are disclosed.

13 Claims, No Drawings

(51) Int. Cl.
  *C08F 290/14* (2006.01)
  *C04B 20/10* (2006.01)
  *C08F 222/06* (2006.01)
  *C04B 111/00* (2006.01)
  *C04B 111/62* (2006.01)
  *C04B 111/70* (2006.01)
  *C04B 111/72* (2006.01)

(56) References Cited

U.S. PATENT DOCUMENTS

| | | |
|---|---|---|
| 5,578,668 A | 11/1996 | Colombet et al. |
| 5,798,425 A | 8/1998 | Albrecht et al. |
| 6,211,317 B1 | 4/2001 | Albrecht et al. |
| 6,946,510 B2 | 9/2005 | Suau et al. |
| 8,262,793 B2 | 9/2012 | Stohr et al. |
| 2002/0188093 A1 | 12/2002 | Kroner et al. |
| 2002/0195025 A1 | 12/2002 | Bacher et al. |
| 2009/0312460 A1 | 12/2009 | Lorenz et al. |
| 2011/0179976 A1 | 7/2011 | Huber et al. |
| 2011/0207855 A1 | 8/2011 | Suau et al. |
| 2012/0097076 A1 | 4/2012 | Stohr et al. |

FOREIGN PATENT DOCUMENTS

| | | | |
|---|---|---|---|
| DE | 195 13 126 A1 | 10/1996 | |
| DE | 198 34 173 A1 | 2/1999 | |
| EP | 1 260 535 A1 | 11/2002 | |
| EP | 1437330 A1 * | 7/2004 | ......... C04B 24/2647 |
| WO | WO 01/96007 A1 | 12/2001 | |
| WO | WO 2010/066576 A1 | 6/2010 | |
| WO | WO 2011/104590 A1 | 9/2011 | |

OTHER PUBLICATIONS

PCT/EP2012/068827—International Search Report, dated Nov. 16, 2012.
PCT/EP2012/068827—International Written Opinion, dated Nov. 16, 2012.
PCT/EP2012/068827—International Preliminary Report on Patentability, dated Apr. 1, 2014.

* cited by examiner

POWDER COMPOSITION FOR RAPID SUSPENSION

CROSS REFERENCE TO RELATED APPLICATIONS

This application is a national stage application of International Application No. PCT/EP2012/068827, filed 25 Sep. 2012, which claims priority from European Patent Application No. 11183537.7, filed 30 Sep. 2011, from which applications priority is claimed, and which are incorporated herein by reference.

The invention relates to a quickly suspendable pulverulent composition which can be produced by bringing a powder which comprises at least one inorganic binder into contact with a liquid component containing at least one copolymer and an organic solvent. Furthermore, a process for producing the liquid component, the use thereof and also specific copolymers are disclosed.

To achieve improved processability, i.e. kneadability, spreadability, sprayability, pumpability or flowability, of inorganic solids suspensions, additives in the form of dispersants or plasticizers are frequently added to these. Such inorganic solids in the building industry usually comprise inorganic binders such as cement based on portland cement (EN 197), cement having particular properties (DIN 1164), white cement, calcium aluminate cement or high-alumina cement (EN 14647), calcium sulfoaluminate cement, special cements, calcium sulfate n-hydrate (n=0 to 2), lime or building lime (EN 459) and also pozzolanas or latent hydraulic binders such as fly ash, metakaolin, silica dust, slag sand. Furthermore, the inorganic solids suspensions generally contain fillers, in particular particulate rock comprising, for example, calcium carbonate, quartz or other natural rocks of various particle size and particle shape and also further inorganic and/or organic additives to influence properties of building chemical products, e.g. hydration kinetics, rheology or air contents, in a targeted manner. In addition, organic binders such as latex powders can be present.

To convert building material mixtures, in particular those based on inorganic binders, into a ready-to-use, processable form, significantly more make-up water than would be necessary for the subsequent hydration or curing process is generally required. The voids formed as a result of the excess water which evaporates later in the construction element leads to a significant deterioration in mechanical strength, stability and durability.

To reduce this excess water at a given processing consistency and/or to improve the processability at a given water/binder ratio, additives which are generally referred to in building chemistry as water reduction agents or plasticizers are used. Such agents are, in particular, polycondensation products based on naphthalenesulfonic acids or alkylnaphthalenesulfonic acids or melamine-formaldehyde resins containing sulfonic acid groups.

DE 3530258 describes the use of water-soluble sodium naphthalenesulfonic acid-formaldehyde condensates as additives for inorganic binder and building materials. These additives have been described for improving the flowability of the binders such as cement, anhydrite or gypsum and the building materials produced therewith.

DE 2948698 describes hydraulic mortars for screeds, which contain plasticizers based on melamine-formaldehyde condensation products and/or sulfonated formaldehyde-naphthalene condensates and/or lignosulfonate and, as binder, portland cement, clay-containing lime marl, clay clinker and soft-fired clinker.

Apart from the purely anionic plasticizers, which contain essentially carboxylic acid groups and sulfonic acid groups, weakly anionic comb polymers which usually bear anionic charges on the main chain and contain nonionic polyalkylene oxide side chains have been described as a newer group of plasticizers.

WO 01/96007 describes these weakly anionic plasticizers and milling aids for aqueous mineral suspensions, which are prepared by free-radical polymerization of monomers containing vinyl groups and contain polyalkylene oxide groups as a main component.

DE 19513126 and DE 19834173 describe copolymers based on unsaturated dicarboxylic acid derivatives and oxyalkylene glycol alkenyl ethers and their use as additives for hydraulic binders, in particular cement.

The aim of the addition of plasticizers in the building industry is either to increase the plasticity of the binder system or to reduce the amount of water required under the same processing conditions.

It has been found that plasticizers based on lignosulfonate, melaminesulfonate and polynaphthalenesulfonate are clearly inferior in terms of their effectiveness to the weakly anionic, polyalkylene oxide-containing copolymers. These copolymers are also referred to as polycarboxylate ethers (PCE). Polycarboxylate ethers do not only disperse the inorganic particles by means of electrostatic charging due to the anionic groups (carboxylate groups, sulfonate groups) present on the main chain but additionally stabilize the dispersed particles by means of steric effects caused by the polyalkylene oxide side chains which absorb water molecules so as to form a stabilizing protective layer around the particles.

As a result, the amount of water required for producing a particular consistency can be reduced compared to the classical plasticizers or else the plasticity of the moist building material mixture is reduced by the addition of the polycarboxylate ethers to such an extent that self-compacting concrete or self-compacting mortar can be produced at low water/cement ratios. In addition, this facilitates the use of the polycarboxylate ethers for producing ready-mixed concrete or ready-mixed mortar which remains pumpable over relatively long periods of time or for producing high-strength concretes or high-strength mortars by setting of a low water/cement ratio.

Apart from the polycarboxylate ethers described, a series of derivatives having a modified effect profile are now also known. Thus, for example, US 2009312460 describes polycarboxylate esters in which the ester function is hydrolyzed after introduction into a cement-based, aqueous mixture and a polycarboxylate ether is formed as a result. Polycarboxylate esters have the advantage that they develop their action only after some time in the cement-based mixture and as a result the dispersing effect can be maintained over a relatively long period of time.

Dispersants based on polycarboxylate ethers and their derivatives are offered for sale either as a solid in powder form or as an aqueous solution. Pulverulent polycarboxylate ethers can, for example, be mixed into a factory dry mortar during its production. When the factory dry mortar is mixed with water, the polycarboxylate ethers dissolve and can then display their action.

As an alternative, it is also possible to add polycarboxylate ethers or their derivatives in dissolved form to the inorganic solids suspension. In particular, the dispersant can be introduced directly into the make-up water.

However, all methods known hitherto for introducing plasticizers into an inorganic solids suspension have the disadvantage that the dispersing action is not displayed immediately after addition of the make-up water. Regardless of whether the dispersant is added as powder or in aqueous solution, it can take, for example in the case of a dry mortar, depending on the water to cement ratio (w/c value) or water requirement, over 100 seconds after addition of the make-up water with vigorous stirring before a homogeneous suspension is obtained. This is particularly problematical when using mixing pumps.

It was therefore an object of the present invention to provide pulverulent compositions based on inorganic binder systems, which can be homogeneously dispersed by means of water more quickly than has been possible using the previously known compositions.

This object was achieved by a pulverulent composition which can be produced by bringing a powder which comprises at least one inorganic binder into contact with from 0.01 to 10% by weight, in particular from 0.05 to 5% by weight and particularly preferably from 0.1 to 2% by weight, based on the total mass of the composition, of a liquid component comprising at least one copolymer which can be obtained by polymerization of a mixture of monomers comprising (I) at least one ethylenically unsaturated monomer which comprises at least one radical selected from the group consisting of carboxylic acid, carboxylic acid salt, carboxylic esters, carboxamide, carboxylic anhydride and carboximide and (II) at least one ethylenically unsaturated monomer having a polyalkylene oxide radical, where the liquid component contains at least 1% by weight, preferably from 5 to 60% by weight, in particular from 25 to 50% by weight, of the at least one copolymer and at least 30% by weight, preferably from 98 to 35% by weight, in particular from 90 to 40% by weight and particularly preferably from 80 to 50% by weight, of an organic solvent.

Here, it has surprisingly been found that not only could the stated object be achieved in its full scope but the pulverulent composition has not only excellent dispersibility but at the same time excellent processing properties, with it having been possible to improve the pumpability and reduce the electrical power required in the mixing process. In particular, a significant reduction in dust formation during handling of the pulverulent composition was observed. It was also surprising that the ability of the pulverulent composition of the invention to be stored was not, or not significantly, impaired by the liquid component.

The copolymers according to the present invention contain at least two monomer building blocks. However, it can also be advantageous to use copolymers having three or more monomer building blocks.

In a preferred embodiment, the ethylenically unsaturated monomer (I) is represented by at least one of the following general formulae from the group (Ia), (Ib) and (Ic):

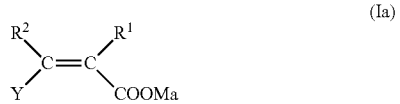

(Ia)

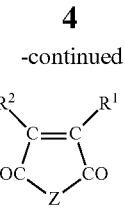

(Ib)

In the monocarboxylic or dicarboxylic acid derivative (Ia) and the cyclic monomer (1b), where Z=O (acid anhydride) or NR² (acid imide), R¹ and R² are each, independently of one another, hydrogen or an aliphatic hydrocarbon radical having from 1 to 20 carbon atoms, preferably a methyl group. Y is H, —COOK, —CO—O($C_qH_{2q}O$)$_r$—R³, —CO—NH—($C_qH_{2q}O$)$_r$—R³.

M is hydrogen, a monovalent or divalent metal cation, preferably sodium, potassium, calcium or magnesium ion, or ammonium or an organic amine radical and a=½ or 1, depending on whether M is a monovalent or divalent cation. As organic amine radicals, preference is given to using substituted ammonium groups which are derived from primary, secondary or tertiary $C_{1-20}$-alkylamines, $C_{1-20}$-alkanolamines, $C_{5-8}$-cycloalkylamines and $C_{6-14}$-arylamines. Examples of the corresponding amines are methylamine, dimethylamine, trimethylamine, ethanolamine, diethanolamine, triethanolamine, methyldiethanolamine, cyclohexylamine, dicyclohexylamine, phenylamine, diphenylamine in the protonated (ammonium) form.

R³ is hydrogen, an aliphatic hydrocarbon radical having from 1 to 20 carbon atoms, a cycloaliphatic hydrocarbon radical having from 5 to 8 carbon atoms, an aryl radical which has from 6 to 14 carbon atoms and may be additionally substituted, q=2, 3 or 4 and r=0 to 200, preferably from 1 to 150. The aliphatic hydrocarbons can here be linear or branched and saturated or unsaturated. Preferred cycloalkyl radicals are cyclopentyl or cyclohexyl radicals, and preferred aryl radicals are phenyl or naphthyl radicals which may be additionally substituted by, in particular, hydroxyl, carboxyl or sulfonic acid groups.

The following formula represents the monomer (Ic):

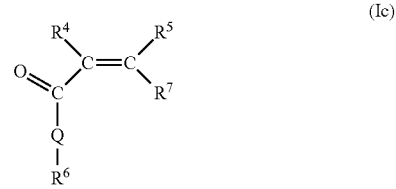

(Ic)

Here, R⁴ and R⁵ are each, independently of one another, hydrogen or an aliphatic hydrocarbon radical having from 1 to 20 carbon atoms, a cycloaliphatic hydrocarbon radical having from 5 to 8 carbon atoms, an optionally substituted aryl radical having from 6 to 14 carbon atoms. The radicals Q can be identical or different and are each NH, NR³ or O, where R³ is as defined above.

Furthermore, the radicals R⁶ are identical or different and are each ($C_nH_{2n}$)—SO₃H where n=0, 1, 2, 3 or 4, ($C_nH_{2n}$)—OH where n=0, 1, 2, 3 or 4; ($C_nH_{2n}$)—PO₃H₂ where n=0, 1, 2, 3 or 4, ($C_nH_{2n}$)—OPO₃H₂ where n=0, 1, 2, 3 or 4, ($C_6H_4$)—SO₃H, ($C_6H_4$)—PO₃H₂, ($C_6H_4$)—OPO₃H₂ and ($C_nH_{2n}$)—NR⁸$_b$ where n=0, 1, 2, 3 or 4 and b=2 or 3.

R⁷ is H, —COOM$_a$, —CO—O($C_qH_{2q}O$)$_r$—R³, —CO—NH—($C_qH_{2q}O$)$_r$—R³, where M$_a$, R³, q and r are as defined above.

$R^8$ is hydrogen, an aliphatic hydrocarbon radical having from 1 to 10 carbon atoms, a cycloaliphatic hydrocarbon radical having from 5 to 8 carbon atoms, an optionally substituted aryl radical having from 6 to 14 carbon atoms.

Furthermore, for the purposes of the present invention, the polyethylenically unsaturated monomer (II) is preferably represented by the following general formula:

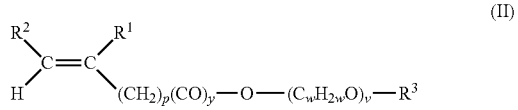
(II)

where p is an integer from 0 to 6, y is 0 or 1, v is an integer from 3 to 500 and the indices w are, independently of one another, identical or different for each $(C_wH_{2w}O)$ unit and are each an integer from 2 to 18.

$R^1$, $R^2$ and $R^3$ are as defined above.

In a preferred embodiment of the general formula (II), p is an integer from 0 to 4, v is an integer from 5 to 500 and the indices w are, independently of one another, identical or different for each $(C_wH_{2w}O)$ unit and are each 2 or 3. Particular preference is given to at least a subregion being formed by a random ethylene oxide-propylene oxide copolymer and the molar proportion of propylene oxide units preferably being from 10 to 30%, based on the sum of the ethylene oxide and propylene oxide units of the random ethylene oxide-propylene oxide copolymer.

The molar proportion of the monomers (I) and (II) in the copolymer of the invention can be chosen freely within a wide range. It has been found to be particularly advantageous for the proportion of the monomer (I) in the copolymer to be from 5 to 95 mol %, preferably from 30 to 95 mol % and in particular from 55 to 95 mol %. In a further preferred embodiment, the proportion of the monomer (II) in the copolymer is from 1 to 89 mol %, in particular from 1 to 55 mol % and particularly preferably from 1 to 30 mol %.

The monomer (II) preferably has a molecular weight of from 500 to 10 000 g/mol.

In a preferred embodiment, the copolymer of the invention has a molecular weight of from 12 000 to 75 000 g/mol.

As organic solvent, preference is given to using all organic solvents in which the copolymer of the invention has a good solubility. Particularly preferably, at least 1% by weight, preferably at least 25% by weight and in particular at least 40% by weight, of the copolymer should dissolve in the organic solvent, based on the total mass of solvent and copolymer. The solubility of the copolymer depends on the specific monomers selected and the ratios of the monomers used and can be determined by simple tests. In particular, the solvent is at least one solvent selected from the group consisting of ethyl acetate, n-butyl acetate, 1-methoxy-2-propyl acetate, ethanol, i-propanol, n-butanol, 2-ethylhexanol, 1-methoxy-2-propanol, ethylene glycol, propylene glycol, acetone, butanone, pentanone, hexanone, methyl ethyl ketone, ethyl acetate, butyl acetate, amyl acetate, tetrahydrofuran, diethyl ether, toluene, xylene or higher-boiling alkylbenzenes. Further possible solvents are polyethylene glycol ethers or polypropylene glycol ethers or random ethylene oxide-propylene oxide copolymers having an average molar mass in the range from 200 to 2000 g/mol, monoethylene, diethylene or triethylene glycol, monopropylene, dipropylene or tripropylene glycol, methylalkylene, ethylalkylene, propylalkylene, butylalkylene or higher alkylpolyalkylene glycol ethers having 1, 2, 3 or more ethylene glycol and/or propylene glycol units, for example methoxypropanol, dipropylene glycol monomethyl ether, tripropylene glycol monomethyl ether, ethylene glycol monobutyl ether, diethylene glycol monobutyl ether, butylpolyethylene glycol ethers, propylpolyethylene glycol ethers, ethylpolyethylene glycol ethers, methylpolyethylene glycol ethers, dimethylpolyethylene glycol ethers, dimethylpolypropylene glycol ethers, glycerol ethoxylates having a molecular weight of from 200 to 20 000 g/mol, pentaerythritol alkoxylates, ethylene carbonate, propylene carbonate, glyceryl carbonate, glycerol formal and 2,3-O-isopropylideneglycerol. Particular preference is given to alkylpolyalkylene glycol ethers and particularly preferably methylpolyethylene glycol ethers and also polyethylene glycol ethers, polypropylene glycol ethers and random ethylene oxide/propylene oxide copolymers having an average molar mass in the range from 200 to 2000 g/mol. Preference is also given to solvents based on carbonates, in particular ethylene carbonate, propylene carbonate and glyceryl carbonate.

The liquid component according to the invention can also contain water. A high water content of the liquid component can, depending on the constituents of the pulverulent composition and in particular depending on the inorganic binder used, lead to impairment of the ability of the pulverulent composition of the invention to be stored. For this reason, the water content is particularly preferably <10% by weight, in particular <1% by weight. In particular, the water content can be in the range from 30 to 0.01% by weight, preferably from 10 to 0.01% by weight and particularly preferably from 1 to 0.1% by weight, of the liquid component. Thus, the use of water scavengers can be particularly advantageous. Water scavengers either bind water in their crystal structure or consume the water via other mechanisms before the binder can react therewith and adversely affect the product properties. In particular, the water scavengers can be molecular sieves or salts which bind water quickly, for example CaO. Water scavengers can lead to a higher water tolerance of the pulverulent composition of the invention, and in this case no impairment of the ability of the pulverulent composition of the invention to be stored is observed.

As regards the solubility of the copolymer of the invention in the liquid component, it has been found to be particularly advantageous for the monomer (I) or (II) to comprise random ethylene oxide-propylene oxide copolymer having a molecular weight of from 160 to 10 000 g/mol, in particular from 500 to 6000 g/mol, with the molar proportion of propylene oxide units preferably being from 10 to 30%, based on the sum of the ethylene oxide and propylene oxide units. In this case, the organic solvent is in particular alkylpolyalkylene glycol ethers and particularly preferably methylpolyethylene glycol ethers or else polyethylene glycol ethers, polypropylene glycol ethers or random ethylene oxide-propylene oxide copolymers having an average molar mass in the range from 200 to 2000 g/mol.

To achieve a very quick suspendability of the pulverulent composition of the invention, it is advantageous for at least 50% by weight, preferably at least 80% by weight and particularly preferably at least 99% by weight, of the at least one copolymer of the invention to be present in dissolved form in the liquid component. In particular, the copolymer is dissolved in the liquid component.

The contacting of the powder which comprises at least one inorganic binder with the liquid component containing the copolymer of the invention can be carried out in any way known to those skilled in the art for this purpose. It has been found to be particularly useful for the liquid component to be brought into contact with the powder by spraying or atomization, with the process preferably comprising a mixed step. In this way, homogeneous application combined with good adhesion and initial adhesion can be ensured in a simple way. Of course, the contacting of the powder with the liquid component can also be carried out in any other suitable way. Possibilities here are, in particular, blending or stirring together, but spray application is clearly preferred since this is the simplest and most economically attractive application variant.

In a particularly preferred embodiment, further additives can additionally be mixed into the liquid component, depending on the use, with these preferably being present in dissolved form. In particular, the liquid component can contain, based on the total mixture, from 0.5 to 69% by weight of at least one further additive. In this way, the pulverulent composition can be admixed with further additives in a simple way, which represents a particularly economical procedure and may also allow a separated drying step to be dispensed with. The particularly homogeneous distribution of the further additive enables the effect thereof immediately after mixing with water to be improved, which is a further advantage of this embodiment.

In a further preferred embodiment, the liquid component consists of a solution of the copolymer of the invention in an organic solvent.

The pulverulent composition should, for the purposes of the present invention, preferably be present in dry form, which means that it has a water content determined by the Karl-Fischer method of less than 5% by weight, preferably less than 1% by weight and particularly preferably less than 0.1% by weight.

Preference is given to the powder which comprises at least one inorganic binder having an average particle size in the range from 0.1 to 1000 µm, particularly preferably from 1 to 200 µm. The particle size is preferably determined by laser light scattering.

The present invention further provides a specific copolymer which has a particularly good solubility in organic solvents, in particular in alkylpolyalkylene glycol ethers and particularly preferably methylpolyethylene glycol ethers and also polyethylene glycol ethers, polypropylene glycol ethers and random ethylene oxide-propylene oxide copolymers having an average molar mass in the range from 200 to 2000 g/mol. The copolymer of the invention can be obtained by polymerization of a mixture of monomers comprising A) from 50 to 95 mol % of at least one ethylenically unsaturated monomer, which comprises at least one carboxylic acid function and/or a carboxylic acid salt and B) from 5 to 50 mol % of at least one monomer of the formula (III)

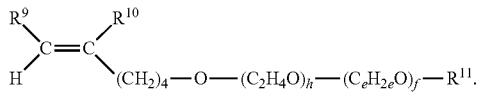

(III)

Here, $R^9$, $R^{10}$ and $R^{11}$ are each, independently of one another, hydrogen or an aliphatic hydrocarbon having from 1 to 5 carbon atoms. Furthermore, h is an integer in the range from 0 to 150. $(C_eH_{2e}O)_f$ is a random ethylene oxide-propylene oxide copolymer in which the molar proportion of propylene oxide units is from 10 to 30%, based on the sum of the ethylene oxide and propylene oxide units, and f is an integer from 10 to 150 and e is 2 or 3.

In a preferred embodiment, the component B) has a molecular weight of from 2000 to 10 000 g/mol, preferably from 2500 to 9000 g/mol and in particular from 3000 to 5000 g/mol.

It has been found to be particularly advantageous for the monomer A) to be acrylic acid.

For the purposes of the present invention, the copolymer of the invention which can be obtained by polymerization of a mixture of monomers comprising A) and B) is preferably present in solution in a liquid component containing at least 1% by weight of the copolymer and at least 30% by weight of an organic solvent. The liquid component preferably contains from 5 to 40% by weight, in particular from 25 to 35% by weight, of the copolymer. The proportion of organic solvent in the liquid component is preferably in the range from 30 to 95% by weight, in particular from 35 to 70% by weight.

In particular, the inorganic binder used according to the invention can be at least one binder selected from the group consisting of cement based on portland cement, white cement, calcium aluminate cement, calcium sulfoaluminate cement, calcium sulfate n-hydrate and a latent hydraulic or pozzolanic binder such as fly ash, metakaolin, silica dust and slag sand. Particular preference is given to cement based on portland cement, calcium sulfate hemihydrate, calcium sulfate anhydrite and calcium aluminate cement.

The pulverulent composition of the invention preferably contains from 2 to 99.9% by weight, in particular from 8 to 50% by weight and particularly preferably from 10 to 40% by weight, of the inorganic binder.

The pulverulent composition of the invention which comprises at least one inorganic binder is preferably a dry mortar or dry concrete. The continual search for extensive rationalization and improved product quality has led to mortar for a wide variety of uses in the construction sector nowadays being virtually no longer mixed from the starting materials on the building site itself. This task is nowadays largely taken over by the building materials industry in the factory and the ready-to-use mixtures are made available as factory dry mortars. Here, finished mixtures which can be made processable on the building site exclusively by addition of water and mixing are, according to DIN 18557, described as factory mortars, in particular as factory dry mortars. Such mortar systems can perform a wide variety of physical construction tasks. Depending on the intended task, further additives are mixed into the binder which can contain, for example, cement and/or lime and/or calcium sulfate in order to match the factory dry mortar to the specific use. These additives can be, for example, shrinkage reducers, expanders, accelerators, retarders, dispersants, thickeners, antifoams, air pore formers, corrosion inhibitors.

The factory dry mortar according to the invention can be, in particular, bricklaying mortars, render mortars, mortars for composite thermal insulation systems, renovation renders, joint grouts, tile adhesives, thin bed mortars, screed mortars, embedding mortars, injection mortars, knifing fillers, sealing slurries or lining mortars (e.g. for mains water pipes).

For the purposes of the present invention, the term factory dry mortar also encompasses inorganic binder without aggregates, in particular portland cement and/or calcium aluminate cement and/or calcium sulfate. In this case, the pulverulent composition according to the invention produced therefrom can also be mixed subsequently with fillers and additives in order to obtain, for example, bricklaying mortars, render mortars, joint grouts, tile adhesives, thin bed mortars, screed mortars, embedding mortars, injection mortars, knifing fillers based on cement or calcium sulfate or lining mortars (e.g. for mains water pipes). A particularly quick homogeneous dispersability of the factory dry mortars produced in this way with water is also achieved by means of this mode of operation.

In a particular embodiment, the factory dry mortar according to the invention can also be a self-leveling composition. This is particularly advantageous since such pulverulent compositions for low layer thicknesses are generally very fine and are therefore comparatively slow to mix with water.

Also included are factory mortars which can be provided with further components, in particular liquid and/or pulverulent additives and/or particulate rock, in addition to water in production on the building site (two-component systems).

The pulverulent composition according to the invention which contains at least one inorganic binder can, however, also be a concrete or a composition for producing concrete.

The inorganic binder can also be gypsum. The expression "gypsum" is in the present context used synonymously with calcium sulfate in its various anhydrous and hydrated forms with and without water of crystallization. Natural gypsum comprises essentially calcium sulfate dihydrate ("dihydrate"). The natural form of calcium sulfate free of water of crystallization is known as "anhydrite". Apart from the natural forms, calcium sulfate is a typical by-product of industrial processes, and is then referred to as "synthetic gypsum". A typical example of a synthetic gypsum from industrial processes is that from flue gas desulfurization. However, synthetic gypsum can equally well be formed as by-product of phosphoric acid or hydrofluoric acid production processes; in these cases, hemihydrates forms such as $CaSO_4 \times \frac{1}{2}H_2O$ ("hemihydrate") are formed. Typical gypsum ($CaSO_4 \times 2H_2O$) can be calcined by removing the water of crystallization. Products of the various calcination processes are α- or β-hemihydrate. β-hemihydrate results from rapid heating in open vessels, resulting in rapid vaporization of water to form voids. α-hemihydrate is produced by dehydration of gypsum in closed autoclaves. The crystal form is in this case relatively dense, so that this binder requires less water for liquefaction than β-hemihydrate. On the other hand, hemihydrate rehydrates with water to form dihydrate crystals. A time of from a few minutes to hours is usually necessary for complete hydration of gypsum, resulting in a shortened processing time compared to cements which require several hours to days for complete hydration. These properties make gypsum a usable alternative to cements as binder in various fields of use. In addition, cured gypsum products display pronounced hardness and compressive strength.

β-Hemihydrate is chosen for a wide variety of fields of use because it is more readily available and displays numerous advantages from an economic point of view. However, these advantages are partly negated by β-hemihydrate having a higher water requirement during processing in order to be able to achieve a flowable slurry at all. in addition, the dried gypsum products produced therefrom tend to be relatively weak, which can be attributed to residual amounts of water which have remained in the crystal matrix during curing. For this reason, such products have a lower hardness than gypsum products which have been produced using smaller amounts of make-up water.

For this reason, gypsum is for the purposes of the present invention particularly preferably β-calcium sulfate hemihydrate. β-Calcium sulfate hemihydrate according to the invention is particularly suitable for use in gypsum-based flow screed.

Formulation of gypsum-based flow screeds has hitherto been possible only with binders based on anhydrite or α-hemihydrate. These types of binders are modifications of gypsum which have a very low water requirement and are thus high-strength binders. However, both components have significant disadvantages compared to β-hemihydrate both in terms of price and availability. The use of β-hemihydrate, on the other hand, is not possible according to the prior art since, owing to the high water requirement, the resulting strengths are too low in order to produce a flow screed of sufficient quality.

It has been found that plasticizers based on lignosulfonate, melaminesulfonate and polynaphthalenesulfonate are not able to reduce the water requirement of β-hemihydrate to a sufficient extent.

The use of polycarboxylate ethers makes a satisfactory water reduction possible but the speed at which polycarboxylate ethers corresponding to the prior art display their action is too low for machine-applied flow screeds.

In the processing of such a screed mixture by machine, a sharp increase in viscosity begins to occur, so that the mixture either cannot be processed homogeneously or the processor counters the viscosity by addition of water on the building site, resulting in separation of the composition. In addition, the excess water which evaporates later leads to a significantly impaired mechanical strength, stability and durability.

Machine-applied gypsum-based flow screeds based on β-calcium sulfate hemihydrate according to the invention, on the other hand, can be processed like the gypsum-based flow screeds based on anhydrite or α-hemihydrate which are known from the prior art and display a comparable or even improved mechanical strength, stability and durability.

The pulverulent composition of the invention which comprises at least one inorganic binder can, in particular, also be a binder compound. This expression refers, in the present context, to mixtures of at least two binders selected from the group consisting of cement, pozzolanic and/or latent hydraulic binder, white cement, special cement, calcium aluminate cement, calcium sulfoaluminate cement and the various water-containing and anhydrous calcium sulfates. These can then optionally contain further additives.

The present invention further provides a process for producing a liquid component comprising at least 30% by weight of an organic solvent, not more than 30% by weight of water, in particular less than 5% by weight and particularly preferably less than 1% by weight of water, and a copolymer obtained by polymerization of a mixture of monomers comprising (I) at least one ethylenically unsaturated monomer which comprises at least one radical selected from the group consisting of carboxylic acid, carboxylic acid salt, carboxylic ester, carboxamide, carboxylic anhydride and carboximide and (II) at least one ethylenically unsaturated monomer having a polyalkylene ether radical, wherein the polymerization of the monomers is carried out in a water-containing solvent, where the water content of the total reaction mixture is more than 10% by weight, in particular more than 20% by weight and particularly preferably more than 40% by weight, the polymerization product is admixed with an organic solvent and water is removed.

The removal of the water can be carried out using all processes known for this purpose to those skilled in the art. In particular, thin film evaporators have been found to be particularly suitable.

Particular preference is given to the monomer (I) being the abovementioned compounds of the formulae (Ia), (Ib) and (Ic) and the monomer (II) being the abovementioned compound of the formula (II).

Water is particularly suitable as solvent in the preparation of the copolymers according to the invention. However, it is also possible to use a mixture of water and an organic solvent, in which case the solvent should be largely inert in respect of free-radical polymerization reactions. In particular, the abovementioned organic solvents are particularly suitable as organic solvent.

The polymerization reaction is preferably carried out in the temperature range from 0 to 180° C., particularly preferably from 10 to 100° C., either at atmospheric pressure or under superatmospheric or subatmospheric pressure. The polymerization can optionally also be carried out under a protective gas atmosphere, preferably under nitrogen.

To initiate the polymerization, it is possible to use high-energy, electromagnetic radiation, mechanical energy or chemical polymerization initiators such as organic peroxides, e.g. benzoyl peroxide, tert-butyl hydroperoxide, methyl ethyl ketone peroxide, cumoyl peroxide, dilauroyl peroxide, or azo initiators, e.g. azobisisobutyronitrile, azobisamidopropyl hydrochloride and 2,2'-azobis(2-methyl-butyronitrile). Inorganic peroxy compounds such as ammonium peroxodisulfate, potassium peroxodisulfate or hydrogen peroxide are likewise suitable, optionally in combination with reducing agents (e.g. sodium hydrogensulfite, ascorbic acid, iron(II) sulfate) or redox systems which contain an aliphatic or aromatic sulfonic acid (e.g. benzenesulfonic acid, toluenesulfonic acid) as reducing component.

As chain transfer agents to regulate the molecular weight, use is made of the customary compounds. Suitable known chain transfer agents are, for example, alcohols such as methanol, ethanol, propanol, isopropanol, n-butanol, sec-butanol and amyl alcohols, aldehydes, ketones, alkyl thiols such as dodecyl thiol and tert-dodecyl thiol, thioglycolic acid, isooctylthioglycolate, 2-mercaptoethanol, 2-mercaptopropionic acid, 3-mercaptopropionic acid and some halogen compounds such as carbon tetrachloride, chloroform and methylene chloride.

In an alternative further embodiment, the process for preparing the copolymers according to the invention can also be carried out an organic solvent or in a mixture of a plurality of organic solvents. In particular, the abovementioned organic solvents are once again particularly suitable.

The present invention further provides for the use of a liquid component comprising at least 30% by weight of an organic solvent and at least 1% by weight of a copolymer which can be obtained by polymerization of a mixture of monomers comprising (I) at least one ethylenically unsaturated monomer which comprises at least one radical selected from the group consisting of carboxylic acid, carboxylic acid salt, carboxylic ester, carboxamide, carboxylic anhydride and carboximide and (II) at least one ethylenically unsaturated monomer having a polyalkylene ether radical, for the treatment of a powder which comprises at least one inorganic binder in order to accelerate homogeneous dispersion of the powder with water, where from 0.01 to 10% by weight of the liquid component, based on the total composition, is used.

Particular preference is once again given to the monomer (I) being the abovementioned compounds of the formulae (Ia), (Ib) and (Ic) and the monomer (II) being the abovementioned compound of the formula (II).

The following examples illustrate the invention.

EXAMPLES

Example 1

Preparation of the Polycarboxylate Ether 385 g of water, 350 g (0.12 mol) of polyethylene glycol-41-3000-hydroxybutylmonovinyl ether (20% of PO, random) are placed in a 1000 ml four-necked flask provided with thermometer, pH meter and reflux condenser.

This mixture is cooled to 15° C. 0.5 g of 2% strength $FeSO_4*18H_2O$ solution and 42.4 g (0.59 mol) of 99% strength acrylic acid are then added. 1.8 g of mercaptoethanol and 5 g of Brüggolit FF6 are then added. A pH of about 4.6 is then established. After a mixing time of 2 minutes, 2.5 g of 50% strength $H_2O_2$ solution are added. After a short time, the polymerization commences and the temperature increases steadily. After about 2 minutes, the reaction reaches the temperature maximum of about 42° C. and a pH of 4.2. After a further 5 minutes, the mixture is brought to pH=5.5 by means of 30 g of 20% strength NaOH solution. This gives a slightly yellowish, clear aqueous polymer solution having a solids content of 51% by weight.

Example 2

Production of the Polycarboxylate Ether Solution in Methylpolyethylene Glycol 500

588 g of the 51% strength aqueous polycarboxylate ether solution from example 1 are weighed into a 2000 ml round-bottomed flask. 700 g of methylpolyethylene glycol 500 (Pluriol® A 500 E from BASF SE) are added. The water is then taken off at 70° C. and 40 mbar by means of a rotary evaporator. At a water content of less than 1% by weight, the evaporation is stopped and the mixture is cooled. The resulting solution is slightly opalescent and has an active compound content of 30% by weight.

Example 3

Production of the Polycarboxylate Ether Solution in Propylene Carbonate 980 g of the 51% strength aqueous polycarboxylate ether solution from example 1 are weighed into a 2000 ml round-bottomed flask. 500 g of propylene carbonate are then added. The water is then taken off at 70° C. and 40 mbar by means of a rotary evaporator. At a water content of less than 1% by weight, the evaporation is stopped and the mixture is cooled. The resulting solution is slightly opalescent and has an active compound content of 50% by weight.

Example 4

Production of the Polycarboxylate Ether Solution in Methylpolyethylene Glycol 500/Glyceryl Carbonate 980 g of the 51% strength aqueous polycarboxylate ether solution from example 1 are weighed into a 2000 ml round-bottomed flask. 500 g of methylpolyethylene glycol 500 (Pluriol® A 500 E from BASF SE)/glyceryl carbonate mixture (7:3) are then introduced. The water is subsequently taken off at 75° C. and 100 mbar by means of a thin film evaporator. At a water content of less than 2% by weight, the evaporation is stopped and the mixture is cooled. The resulting solution is slightly opalescent and has an active compound content of 50% by weight.

Use Example 1

The following pulverulent composition as test formulation (99.80% by weight) using 0.20% by weight of PCE plasticizer (at make-up water values of about 18% by weight based on 100% by weight of dry mortar) serves for determining the mixing rate:

| Starting material | Manufacturer | Function | % by wt. |
| --- | --- | --- | --- |
| Omyacarb 6AL | Omya GmbH | Filler | 10.00 |
| Omyacarb 20 BG | Omya GmbH | Filler | 15.00 |
| Omyacarb 130 AL | Omya GmbH | Filler | 26.43 |
| Milke Classic | Heidelberg Cement AG | Inorganic binder | 30.00 |
| Ciment Fondu | Kerneos Inc. | Inorganic binder | 10.00 |
| Ca(SO)$_4$ (anhydrite) | CAB 30, Lanxess AG | Inorganic binder | 6.00 |
| Vinnapas 5023L | Wacker | Organic binder | 2.00 |
| Tartaric acid | UD Chemie GmbH | Retarder | 0.12 |
| Lithium carbonate | Chemmetall GmbH | Accelerator | 0.10 |
| Vinapor DF 9010 F | BASF Construction Polymers GmbH | Antifoam | 0.15 |
|  |  |  | 99.80 |

299.4 g of the pulverulent composition is treated with 2 g (0.67% by weight based on the dry mortar weight) of a solution from Example 2 (corresponding to 0.2% by weight of dispersant and 0.47% by weight of solvent). To assess the mixability, 300 g of the treated pulverulent composition are placed in a beaker and stirred at 500 revolutions per minute by means of a three-blade axial stirrer. The liquid (54 g of water corresponding to 18% by weight based on the dry mortar weight) is then added and the time after which the fresh mortar visually has a homogeneous consistency is measured. This test mixture requires 8 seconds until a homogeneous consistency is achieved while stirring continually (at 500 revolutions per minute).

An identical pulverulent composition in the case of which the identical dispersant (0.6 g corresponding to 0.2% by weight based on the dry mortar weight) is added in powder form serves as comparison. This homogenized mixture is likewise stirred at 500 revolutions per minute by means of an axial stirrer. The liquid is then added. 54 g of water and 1.4 g of methylpolyethylene glycol 500 (Pluriol® A 500 E from BASF SE) serve as liquid. This mixture then contains, as in the use example according to the invention, 0.6 g of plasticizer and 1.4 g of solvent in addition to the powder mixture. After addition of the liquid, the mortar requires 16 seconds until a homogeneous consistency is achieved.

Use Example 2

Pulverulent Composition

| Starting material | Manufacturer | Function | % by wt. |
| --- | --- | --- | --- |
| Omyacarb 6AL | Omya GmbH | Filler | 10.00 |
| Omyacarb 20 BG | Omya GmbH | Filler | 15.00 |
| Omyacarb 130 AL | Omya GmbH | Filler | 26.48 |
| Milke Classic | Heidelberg Cement AG | Inorganic Binder | 30.00 |
| Ciment Fondu | Kerneos Inc. | Inorganic Binder | 10.00 |
| Ca(SO)$_4$ (anhydrite) | CAB 30, Lanxess AG | Inorganic Binder | 6.00 |
| Starvis 3003 F | BASF Construction Polymers GmbH | Sedimentation Inhibitor | 0.15 |
| Vinnapas 5023L | Wacker | Organic Binder | 2.00 |
| Tartaric acid | UD Chemie GmbH | Retarder | 0.12 |
| Lithium carbonate | Chemmetall GmbH | Accelerator | 0.10 |
| Vinapor DF 9010 F | BASF Construction Polymers GmbH | Antifoam | 0.15 |
|  |  |  | 100.00 |

300 g of the pulverulent composition is treated with 2.0 g (0.67% by weight based on the dry mortar weight) of a solution from example 2 (corresponding to 0.20% by weight of dispersant and 0.47% by weight of solvent). To assess the mixability, 300 g of the treated pulverulent composition are placed in a beaker and stirred at 500 revolutions per minute by means of an axial stirrer. The liquid (63 g of water corresponding to 21% by weight based on the dry mortar weight) is then added and the time after which the fresh mortar visually has a homogeneous consistency is measured. This test mixture takes 9 seconds until a homogeneous consistency is achieved.

An identical pulverulent composition in the case of which the identical dispersant (0.6 g corresponding to 0.20% by weight based on the dry mortar weight) has been added in powder form serves as comparison. This homogenized mixture is likewise stirred at 500 revolutions per minute by means of an axial stirrer. The liquid is then added. 63 g of water and 1.4 g of methylpolyethylene glycol 500 (Pluriol® A 500 E from BASF SE) serve as liquid. This mixture then contains, as in the use example according to the invention, 0.6 g of plasticizer and 1.4 g of solvent in addition to the powder mixture. After addition of the liquid, the mortar requires 18 seconds until a homogeneous consistency is achieved.

Use Example 3

Refractory Mortar

Pulverulent Composition

| Starting material | Manufacturer | Function | % by wt. |
| --- | --- | --- | --- |
| Omyacarb 6AL | Omya GmbH | Filler | 10 |
| Omyacarb 20 BG | Omya GmbH | Filler | 15 |
| Omyacarb 130 AL | Omya GmbH | Filler | 27 |
| CA 270 | Almatis GmbH | Inorganic Binder | 11 |
| CTC 50 | Almatis GmbH | Filler | 37 |
|  |  |  | 100 |

300 g of the pulverulent composition is treated with 2.0 g (0.67% by weight based on the dry mortar weight) of a solution from example 2 (corresponding to 0.20% by weight of dispersant and 0.47% by weight of solvent). To assess the mixability, 300 g of the treated pulverulent composition are placed in a beaker and stirred at 500 revolutions per minute by means of an axial stirrer. The liquid (62 g of water corresponding to 22% by weight based on the dry mortar weight) is then added and the time after which the fresh mortar visually has a homogeneous consistency is measured. This test mixture takes 5 seconds until a homogeneous consistency is achieved.

An identical pulverulent composition in the case of which the identical dispersant (0.6 g corresponding to 0.20% by weight based on the dry mortar weight) has been added in powder form serves as comparison. This homogenized mixture is likewise stirred at 500 revolutions per minute by means of an axial stirrer. The liquid is then added. 66 g of water and 1.4 g of methylpolyethylene glycol 500 (Pluriol® A 500 E from BASF SE) serve as liquid. This mixture then contains, as in the use example according to the invention, 0.6 g of plasticizer and 1.4 g of solvent in addition to the powder mixture. After addition of the liquid, the mortar requires 9 seconds until a homogeneous consistency is achieved.

Use Example 4

32.92 kg of stucco plaster (β-calcium sulfate hemihydrate) are sprayed with 987.57 g of a solution of a polycarboxylate ether in methylpolyethylene glycol 500 (active compound content 10% by weight) produced by a method analogous to example 2 in a Lödige mixer. The polycarboxylate ether solution is metered by means of an airless pump from Graco. The entry pressure is about 1.5 bar and the metering rate is about 320 ml/min. The metered addition commences at an initial temperature of 27° C. and ends at a temperature of 39° C. During the metered addition, the Lödige mixer is operated at a rotation rate of 188 rpm and the cutter head is set to the setting 2. The amount of polycarboxylate ether solution sprayed in is determined by means of a flow meter. To observe the mixing process, the front lid is replaced by a Plexiglas lid. After the metered addition, stirring is continued for a further 10 minutes to give a homogeneous mixture.

To assess the mixability with water, 103 g of the treated stucco plaster are initially homogenized with 100 g of ground limestone (Omyacarb 6AL) and placed in a beaker. While mixing the pulverulent constituents at 200 revolutions per minute by means of an axial stirrer, the make-up water (58 g) is added. The time after which the fresh mortar visually has a homogeneous consistency is subsequently measured. This mixture according to the invention requires about 4 seconds for this.

Comparative Example

An identical composition composed of 100 g of stucco plaster ((3-calcium sulfate hemihydrate) and 100 g of ground limestone (Omyacarb 6AL) to which the identical dispersant (0.3 g) has been added in powder form serves as comparison. While mixing the pulverulent constituents at 200 revolutions per minute by means of an axial stirrer, the liquid component consisting of make-up water (58 g) and solvent (2.7 g of methylpolyethylene glycol 500) is added. Accordingly, 0.3 g of plasticizer and 2.7 g of solvent are present in addition to the stucco plaster and the ground limestone in the mixture, as in the first example. This reference mixture takes about 7 seconds to reach a homogeneous consistency.

The invention claimed is:
1. A pulverulent composition produced by bringing a powder which comprises at least one inorganic binder into contact with from 0.01 to 10% by weight, based on the total mass of the composition, of a liquid component comprising at least one copolymer obtained by polymerization of a mixture of monomers comprising
(I) at least one ethylenically unsaturated monomer which comprises at least one radical selected from the group consisting of carboxylic acid, carboxylic acid salt, carboxylic esters, carboxamide, carboxylic anhydride and carboximide and
(II) at least one ethylenically unsaturated monomer having a polyalkylene oxide radical, where the liquid component contains at least 1% by weight of the at least one copolymer and at least 30% by weight of an organic solvent; wherein said bringing into contact occurs prior to adding make-up water to the powder.

2. The pulverulent composition according to claim 1, characterized in that the composition contains from 5 to 99.5% by weight of the inorganic binder.

3. The pulverulent composition according to claim 1, characterized in that the inorganic binder is at least one binder selected from the group consisting of cement based on portland cement, white cement, calcium aluminate cement, calcium sulfoaluminate cement, calcium sulfate n-hydrate and latent hydraulic or pozzolanic binder.

4. The pulverulent composition according to claim 1, characterized in that at least 50% by weight of the at least one copolymer is present in dissolved form in the liquid component.

5. The pulverulent composition according to claim 1, characterized in that the monomer (I) or (II) comprises a random ethylene oxide-propylene oxide copolymer having a molecular weight of from 160 to 10 000 g/mol.

6. The pulverulent composition according to claim 1, characterized in that the proportion of the monomer (I) in the copolymer is from 5 to 95 mol %.

7. The pulverulent composition according to claim 1, characterized in that the ethylenically unsaturated monomer (I) is represented by at least one of the following general formulae from the group (Ia), (Ib) and (Ic):

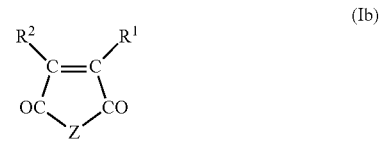

where
$R^1$ and $R^2$ are each, independently of one another, hydrogen or an aliphatic hydrocarbon radical having from 1 to 20 carbon atoms,
Y is H, —COOM$_a$, —CO—O($C_qH_{2q}$O)$_r$—R$^3$, or —CO—NH—($C_qH_{2q}$O)$_r$—R$^3$,
M is hydrogen, a monovalent or divalent metal cation, ammonium ion or an organic amine radical,
a is ½ or 1,
$R^3$ is hydrogen, an aliphatic hydrocarbon radical having from 1 to 20 carbon atoms, a cycloaliphatic hydrocarbon radical having from 5 to 8 carbon atoms, or an optionally substituted aryl radical having from 6 to 14 carbon atoms,
the indices q are, independently of one another, identical or different for each ($C_qH_{2q}$O) unit and are each 2, 3 or 4 and r is from 0 to 200,
Z is O, or $NR^3$,

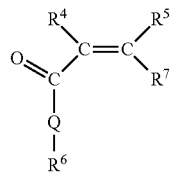
(Ic)

where
$R^4$ and $R^5$ are each, independently of one another, hydrogen or an aliphatic hydrocarbon radical having from 1 to 20 carbon atoms, a cycloaliphatic hydrocarbon radical having from 5 to 8 carbon atoms, or an optionally substituted aryl radical having from 6 to 14 carbon atoms,
the radicals Q are identical or different and are each NH, $NR^3$ or O, where $R^3$ is as defined above,
the radicals $R^6$ are identical or different and are each $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ or $(C_nH_{2n})$—$NR^8{}_b$ where n=0, 1, 2, 3 or 4 and b=2 or 3,
$R^7$ is H, —$COOM_a$, —CO—$O(C_qH_{2q}O)_r$—$R^3$, or —CO—NH—$(C_qH_{2q}O)_r$—$R^3$,
where $M_a$, $R^3$, q and r are as defined above,
$R^8$ is hydrogen, an aliphatic hydrocarbon radical having from 1 to 10 carbon atoms, a cycloaliphatic hydrocarbon radical having from 5 to 8 carbon atoms, or an optionally substituted aryl radical having from 6 to 14 carbon atoms.

8. The pulverulent composition according to claim 1, characterized in that the proportion of the monomer (II) in the copolymer is from 1 to 89 mol %.

9. The pulverulent composition according to claim 1, characterized in that the ethylenically unsaturated monomer (II) is represented by the following general formula

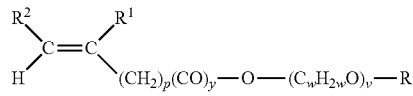
(II)

where
p is an integer from 0 to 6,
y is 0 or 1,
v is an integer from 3 to 500,
the indices w are, independently of one another, identical or different for each $(C_wH_{2w}O)$ unit and are each an integer from 2 to 18,
where $R^1$, $R^2$ are each, independently of one another, hydrogen or an aliphatic hydrocarbon radical having from 1 to 20 carbon atoms, and $R^3$ is hydrogen, an aliphatic hydrocarbon radical having from 1 to 20 carbon atoms, a cycloaliphatic hydrocarbon radical having from 5 to 8 carbon atoms, or an optionally substituted aryl radical having from 6 to 14 carbon atoms.

10. The pulverulent composition according to claim 9, characterized in that, in the general formula (II),
p is an integer from 0 to 4,
v is an integer from 5 to 500,
the indices w are, independently of one another, identical or different for each $(C_wH_{2w}O)$ unit and are each 2 or 3.

11. The pulverulent composition according to claim 1, characterized in that the organic solvent is at least one solvent selected from the group consisting of ethyl acetate, 1-methoxy-2-propyl acetate, ethanol, i-propanol, n-butanol, 2-ethylhexanol, 1-methoxy-2-propanol, ethylene glycol, propylene glycol, acetone, butanone, pentanone, hexanone, methyl ethyl ketone, butyl acetate, amyl acetate, tetrahydrofuran, diethyl ether, toluene, xylene and higher-boiling alkylbenzenes, polyethylene glycol ethers and polypropylene glycol ethers and random ethylene oxide-propylene oxide copolymers having an average molar mass in the range from 200 to 2000 g/mol, monoethylene, diethylene or triethylene glycol, monopropylene, dipropylene or tripropylene glycol, methylpolyalkylene, ethylpolyalkylene, propylpolyalkylene, butylpolyalkylene and higher alkylpolyalkylene glycol ethers having 1, 2, 3 or more ethylene glycol and/or propylene glycol units, glycerol ethoxylates having a molecular weight of from 200 to 20 000 g/mol, pentaerythritol alkoxylates, ethylene carbonate, propylene carbonate, glyceryl carbonate, glycerol formal and 2,3-O-isopropylideneglycerol.

12. The pulverulent composition according to claim 1, characterized in that the organic solvent is n-butyl acetate.

13. The pulverulent composition according to claim 1, characterized in that the composition is a factory dry mortar, a bricklaying mortar, render mortar, mortar for composite thermal insulation systems, renovation mortar, joint grout, tile adhesive, thin bed mortar, screed mortar, embedding mortar, injection mortar, knifing filler, sealing slurry or lining mortar.

* * * * *